(No Model.)  5 Sheets—Sheet 1.

F. H. BOLTE & E. D. KING.
WORKMAN'S TIME RECORDER.

No. 512,499. Patented Jan. 9, 1894.

Witnesses
Geo. W. Young
N. E. Oliphant

Inventors
Frank H. Bolte
Edward D. King
By H. G. Underwood
Attorneys (No Model.) 5 Sheets—Sheet 2.

F. H. BOLTE & E. D. KING.
WORKMAN'S TIME RECORDER.

No. 512,499. Patented Jan. 9, 1894.

Witnesses
Geo. W. Young,
N. E. Oliphant

Inventors
Frank H. Bolte.
Edward D. King.
By H. G. Underwood
Attorneys (No Model.) 5 Sheets—Sheet 3.

F. H. BOLTE & E. D. KING.
WORKMAN'S TIME RECORDER.

No. 512,499. Patented Jan. 9, 1894.

Witnesses.
Geo. W. Ivory.
N. E. Oliphant.

Inventors
Frank H. Bolte
Edward D. King
By H. G. Underwood (No Model.)  F. H. BOLTE & E. D. KING.  5 Sheets—Sheet 4.
WORKMAN'S TIME RECORDER.

No. 512,499.  Patented Jan. 9, 1894.

Witnesses
Geo. W. Tomy
N. E. Oliphant

Inventors
Frank H. Bolte
Edward D. King
By H. G. Underwood
C. N. Worvey (No Model.) F. H. BOLTE & E. D. KING. 5 Sheets—Sheet 5.
WORKMAN'S TIME RECORDER.
No. 512,499. Patented Jan. 9, 1894.
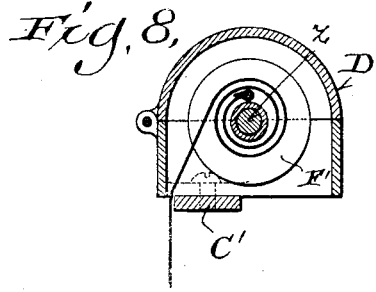
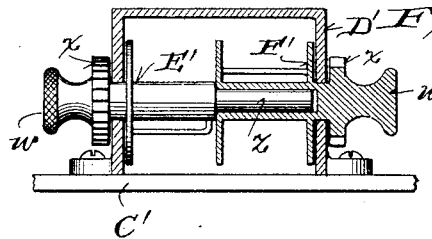
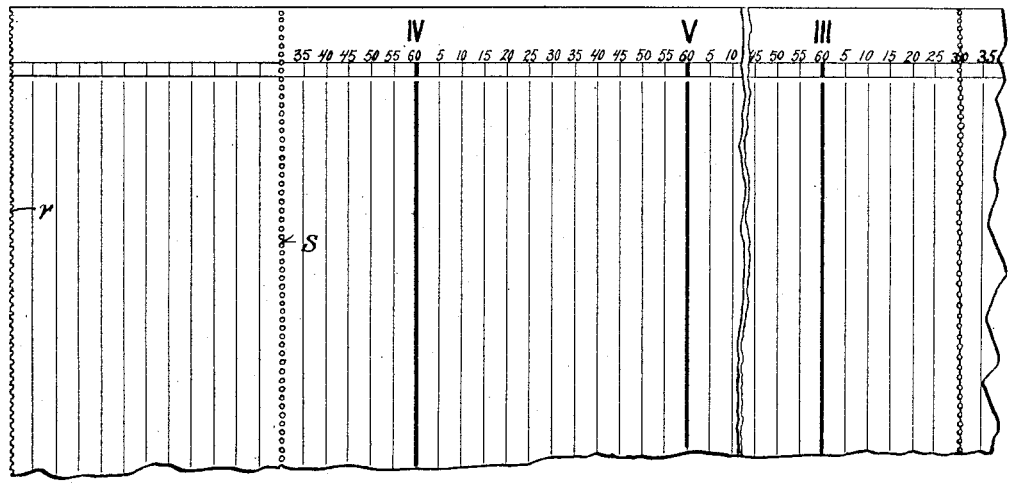
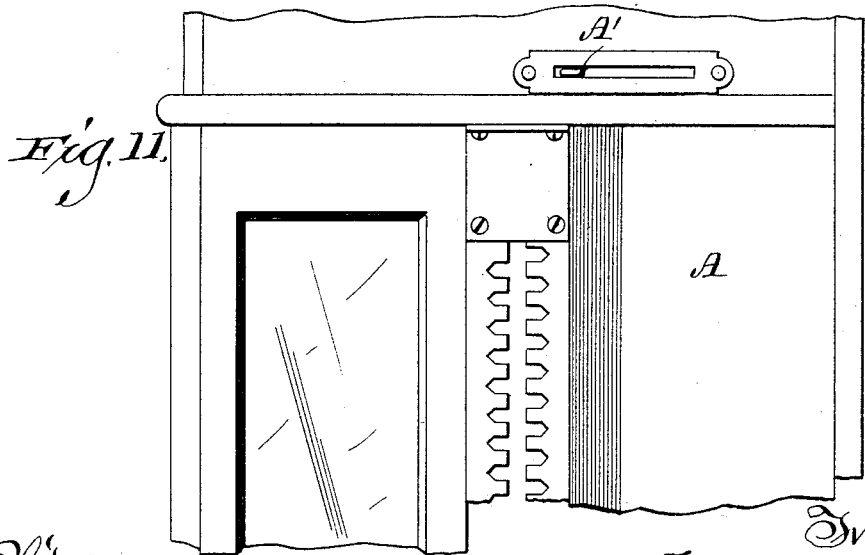
Witnesses.
Geo. W. Young,
N. E. Oliphant
Inventors
Frank H. Bolte
Edward D. King
By H. G. Underwood
Attorney

UNITED STATES PATENT OFFICE.

FRANK H. BOLTE AND EDWARD D. KING, OF MILWAUKEE, WISCONSIN, ASSIGNORS TO THE NATIONAL TIME RECORDER COMPANY, OF SAME PLACE.

WORKMAN'S TIME-RECORDER.

SPECIFICATION forming part of Letters Patent No. 512,499, dated January 9, 1894.

Application filed August 19, 1893. Serial No. 483,539. (No model.)

*To all whom it may concern:*

Be it known that we, FRANK H. BOLTE and EDWARD D. KING, citizens of the United States, and residents of Milwaukee, in the county of Milwaukee, and in the State of Wisconsin, have invented certain new and useful Improvements in Workmen's Time-Recorders; and we do hereby declare that the following is a full, clear, and exact description thereof.

Our invention has for its object to improve that class of workman's time recorders in which a record sheet ruled to correspond with fractional divisions of hours is traveled past a guide-way and operated upon by printing devices inserted in this guide-way against an interposed ink-ribbon, said invention being particularly an improvement on the recorder set forth in United States Patent No. 491,978, of February 21, 1893, and consisting in certain peculiarities of construction and combination of parts hereinafter described with reference to the accompanying drawings and subsequently claimed.

Figure 1:
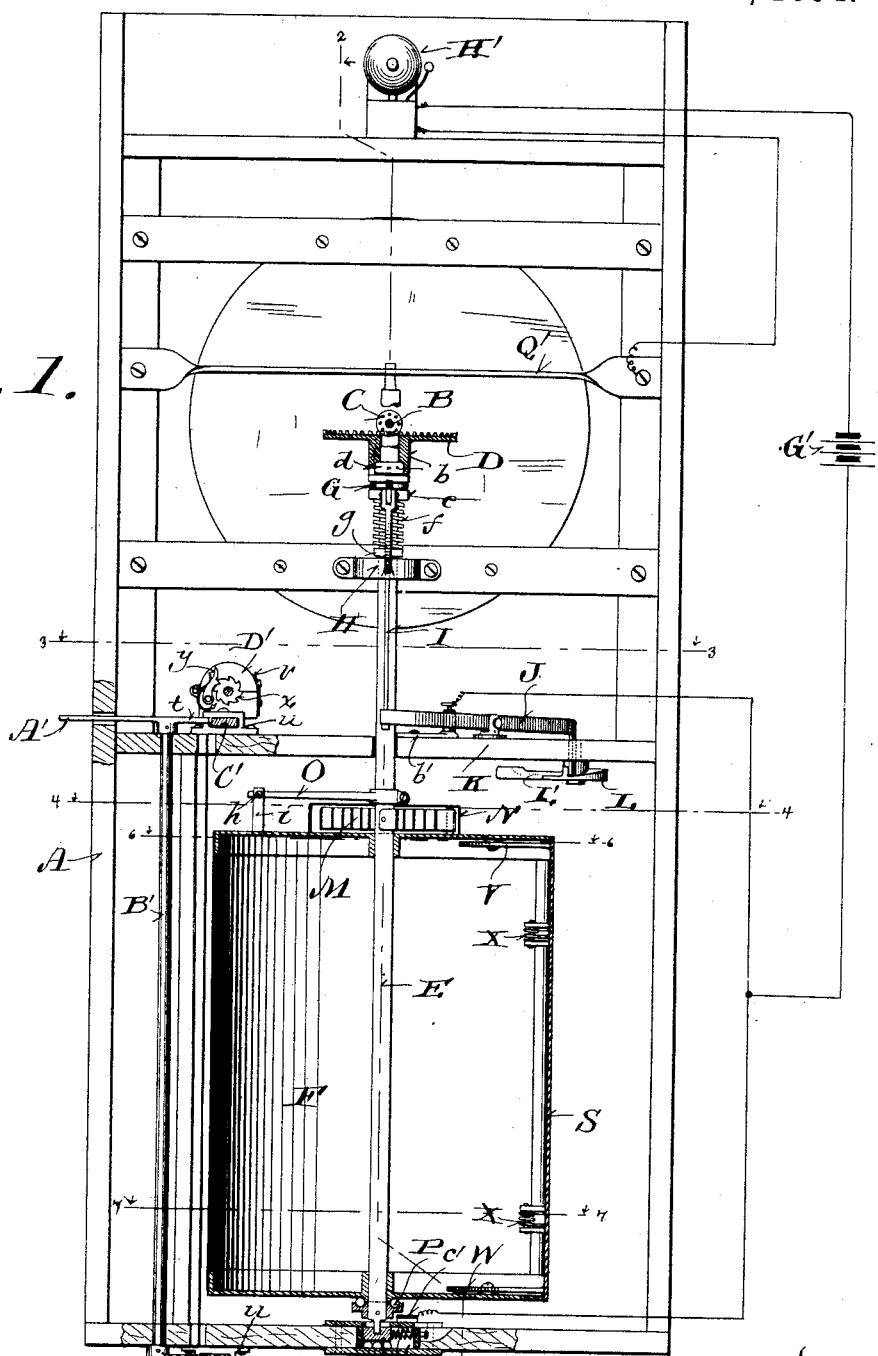
Figure 2:
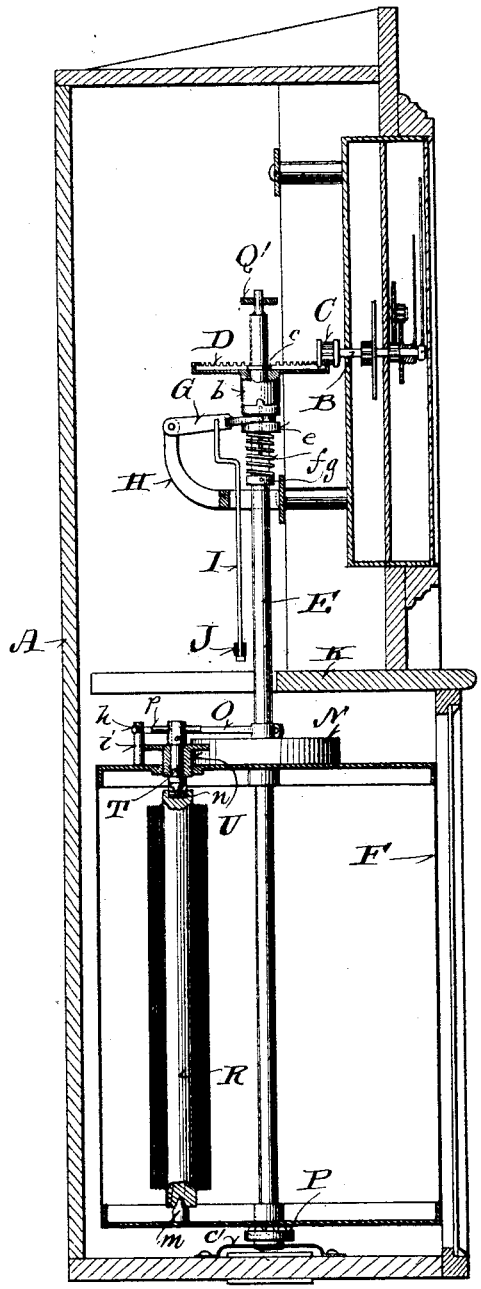
Figure 3:
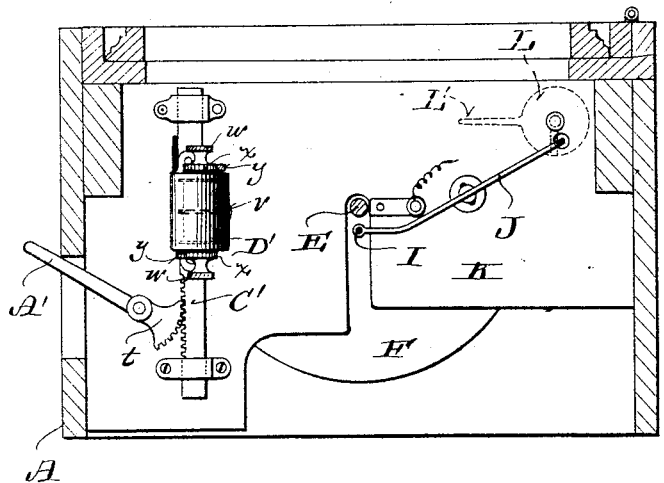
Figure 4:
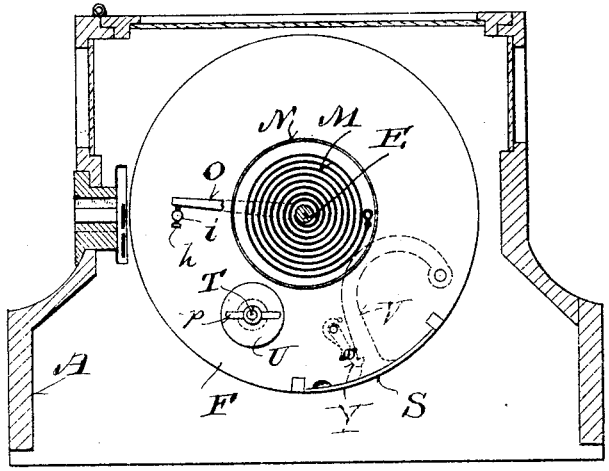
Figure 5:
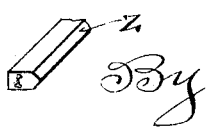
Figure 6:
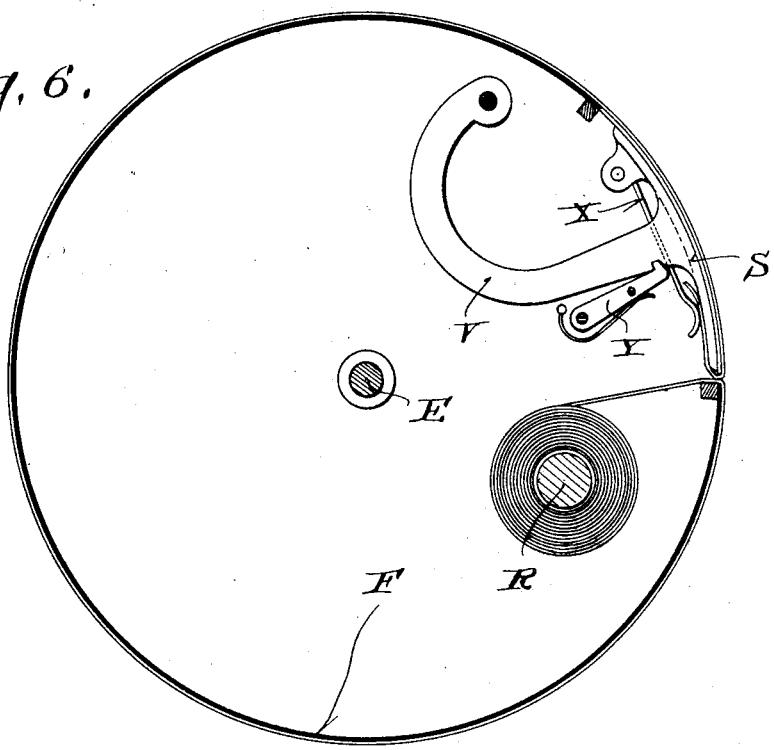
Figure 7:
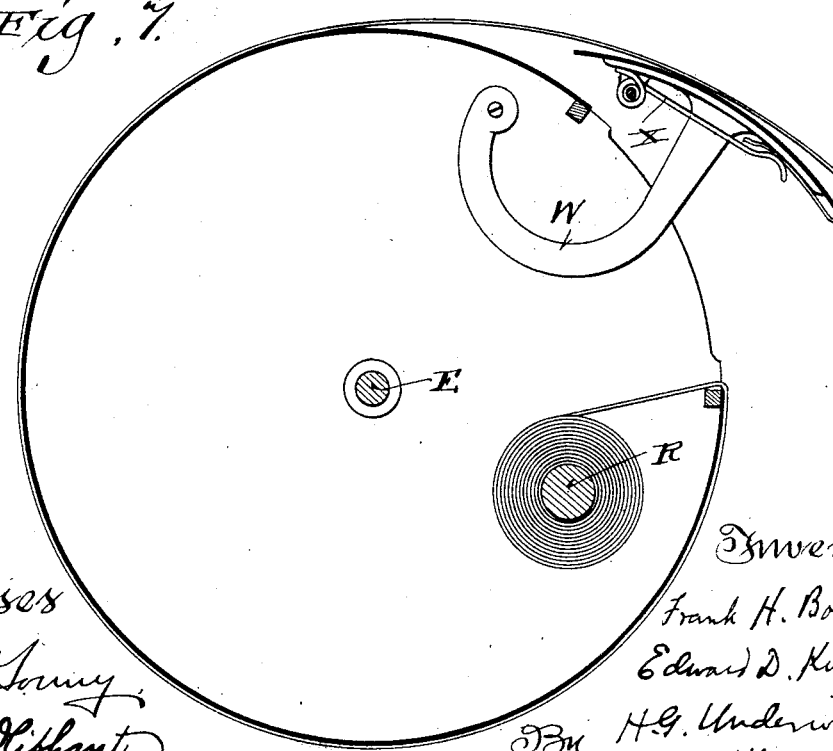

In the drawings: Figure 1 represents a rear elevation, partly in section, of an assemblage of parts involved in our invention; Fig. 2, a section on line 2—2 of the preceding figure; Figs. 3 and 4 horizontal sections respectively taken on lines 3—3 and 4—4 of Fig. 1; Fig. 5, a perspective view of a portion of a registering key that operates in conjunction with an ink-ribbon and record sheet; Figs. 6 and 7 detail horizontal sections respectively taken on lines 6—6 and 7—7 of Fig. 1, to represent, on an enlarged scale, the record sheet in connection with a rotative drum; Figs. 8 and 9 detail sections illustrating a movable ribbon controlling mechanism constituting part of our invention; Fig. 10, a detail elevation of a portion of a record sheet that also constitutes part of our invention, and Fig. 11, a like view illustrating key guides and a ribbon shifting-lever involved in said invention.

Referring by letter to the drawings A represents a main casing having transparent portions for the purpose of exposing certain of its contents to view, this casing being substantially similar to the one shown in the above named patent. Like in the patent aforesaid, it is intended that the major portion of the casing shall be hung on hinges so as to swing out from the back to permit of ready access to the interior mechanism, but ordinarily said casing will be closed and locked. As is also shown in the former patent, a standard clock is arranged in the casing and has its dial and hands exposed through a transparent portion of the same, the arbor B of the minute hand being extended a certain distance toward the rear and provided with a pinion C that meshes with a crown-wheel D on the shaft E of a drum F hereinafter more particularly described, and the peculiar arrangement of the shaft, as well as the connection therewith of the crown-wheel, and certain other relative parts constitute an important feature of the present invention.

As herein shown the crown-wheel D has a clutch-hub $b$ loose on the shaft E between fixed collars $c, d$, and a clutch collar $e$ is splined on said shaft to come in and out of engagement with said hub. The clutch-collar is opposed by a spiral-spring $f$ that is supported by a fixed collar $g$ on the shaft, and a circumferential groove in said clutch-collar is engaged by a spanner G pivotally connected to a bracket H that is fast on a stay-piece for the clock movement. The spanner has a link-connection I with one end of a lever J that is fulcrumed to a shelf K within the main casing, and the other end of the lever is extended through a suitable opening in the shelf to bear upon a cam disk L, the latter being pivotally connected to the under side of said shelf and provided with a handle L' of suitable dimensions. By operating the cam-disk the lever J is tilted on its fulcrum to actuate the spanner G through the link-connection I whereby the clutch-collar $e$ may be brought in and out of engagement with the clutch-hub $b$ of the crown-wheel D at will. In the present case, the drum F is loose on the shaft E but connected thereto by means of a coil-spring M arranged within a casing N on the upper drum-head, and an arm O fast on said shaft opposes a screw or other suitable stop $h$ adjustable in a post $i$ on said drum-head, the purpose of the adjustment being hereinafter set forth. In order to lessen friction, the drum has a ball-bearing connection P with the lower portion of the shaft E, and this end of said shaft turns in a ball-bearing step Q arranged in a socket $j$ connected to the lower end of the main casing, said step being held in its normal position by means of a spring $k$ in the socket, but the other end of the aforesaid shaft turns in a horizontal plate Q' secured in the main casing.

As one of the essential features of the present invention, attention is called to the fact that the roller R containing a supply of record paper is journaled within the drum F, and that the latter is provided with a gate S constituting a clamp for so much of said paper as may be exposed thereon.

As a matter of detail, the lower end of the roller R turns on a conical stud $m$ on the lower drum-head and the upper end of said roller has a seat engaged by a blade $n$ on a shouldered pin T that is free to turn in a nut U adjustable in the upper drum-head, said pin being held against longitudinal play by means of its collars and provided with a crosspiece $p$ to facilitate its rotary adjustment whenever it becomes necessary to take up slack of the record paper on the aforesaid roller. To prevent rotation of the record paper roller, the nut U is run down and the pin T being carried therewith there is a clamping action of the stud $m$ and blade $n$ on said roller.

The gate S of the drum is connected to curved brackets V, W, respectively pivoted to the upper and lower heads of said drum within the latter, and spring-clamps X are connected in any suitable manner to the inner side of said gate.

In practice, paper drawn from the roller R is carried around outside the drum and gate, the free end of said paper being turned over an edge of said gate and held against the inner side of the same by the spring-clamps above specified, after which the aforesaid gate is swung to its normal position. The gate being closed, a notch in the bracket V is automatically engaged by a spring-catch Y pivoted to the upper drum-head and the paper is drawn taut on the drum by turning the pin T in the proper direction, after which the roller R is locked against rotation by running down the nut U, as above described.

In the present case the web of record paper has vertical rows of perforations in pairs at certain intervals, the distance between a row $r$ and adjacent row $s$ being equal to the width of the fold that comes under the gate above described, and the distance between the row $s$ and a succeeding row $r$ is equal to the circumference of the drum. From the foregoing it will be seen that the paper folds evenly on the rows $s$ of perforations and tears off in sheets on the rows $r$ each sheet being divided by ruling into spaces representing a predetermined number of hours and these spaces are also ruled to mark subdivisions of an hour, Fig. 10 showing heavy lines indicating hours and light lines indicating five minute sub-divisions of each hour. The hour lines are preferably indicated by figures corresponding to those on the dial of the clock and the five minute sub-divisions of each hour by Arabic numerals, the paper being arranged on the drum so that at the registering point the time indicated thereon will always be synchronous with that of the clock, and to compensate for variations the stop $h$ is adjusted in its bearing. When a sheet is to be torn off the web of record paper the cam-disk L is operated to unclutch the collar $e$ and crown-wheel hub $b$, and thus this wheel is free to rotate while the drum and its shaft are under the control of the operator during the time required to open the gate S, draw said paper from the roll, make the tear and again connect the aforesaid paper with the drum in the manner above specified. The paper having been positioned, the cam-disk is reversed and the spring $k$ expands to elevate the clutch, the drum and spring-connected shaft being turned by hand until said clutch and the crown-wheel hub engage thus bringing the time delineated on said paper into synchrony with that of the clock at the registering point.

The registrations are made by keys Z inserted in corresponding guides at one side of the main casing parallel to the drum a portion of one of the keys being illustrated by Fig. 5, and certain of the guides shown in Fig. 11, said guides being preferably cut in a metallic plate that fits a corresponding opening in said casing. Each workman is furnished with a key and the latter has one end provided with an arbitrary design such as a character or characters representing a number, the latter being preferably in relief. On arrival or departure from work the workman inserts his key in the proper guide against an ink-ribbon and the latter being pressed against the paper on the drum, the design on said key is printed on said paper. The time-scheme on said drum being synchronous with the clock, there is a record of the time at which each registration is made, and that portion of the casing containing the drum being transparent, any of the registrations will be visible for several hours after being made.

In the present case it is possible to make the registrations in two colors, one indicating the arrival, and the other the departure of the workman. To effect this result we employ two ink-ribbons of contrasting color, either ribbon being brought into register with the key-guides by a shifting lever A' arrangd to extend outward from the main casing within easy reach of the workmen. The shifting lever is fast on the upper end of a vertical rod B' and has its inner end in the form of a toothed quadrant $t$ that engages with a rack bar C' loose in the guides $u$ on the shelf K, above specified. The lower end of the rod B' is also provided with a toothed quadrant $t$ engaging a rack-bar C' loose in guides $u$ on the bottom of the main casing. Fast on the rack bars C' are cases D' having hinged sections held closed by spring-latches $v$ or other suitable means and each case has bearings for a pair of ink-ribbon spools E' F', each of these spools being provided with a thumb-piece $w$ and a ratchet $x$, the latter being engaged by a detent $y$ to prevent accidental unwind of the ribbon. It is also to be noted that the ribbons draw against edges of the rack-bars and are thereby kept from curling. Each spool E' has a shank $z$ loosely engaging a corresponding bore in the adjacent spool F' and thus either of these spools may be rotated independent of the other. If the shifting lever be moved in one direction, the ribbon on the spools E' will be in register with the key-guides, but when said lever is moved in the opposite direction, the ribbon on the spools F' is brought into commission, and these ribbons are of contrasting color, as above explained. Should a workman hold his key for any length of time against the drum F, rotation of the latter will cease, the result being a contraction of the spring M while the shaft E continues its rotation, but as soon as the pressure of the registering key is removed from said drum the latter is actuated by the expansion of said spring and turns on its axis until its stop $h$ catches up with the shaft-arm O, thereby bringing the time-scheme again into synchrony with the clock at the registering-point. The shelf K and bottom of the main casing are shown as provided with contact points $b'$ $c'$ opposed to the shaft E, and these contact points are wired to a source G' of electricity and an audible signal H' as shown in Fig. 1. Registering keys being pressed against the upper portion of the drum, there is spring enough in the shaft E to permit the same to impinge against the contact-point $b'$ to thereby close a circuit and actuate the audible signal, but when registering keys are pressed against the lower portion of said drum, there is a yield of the ball-bearing step Q against the power of the spring $k$ and said shaft or suitable metallic part thereon impinges against the contact point $c'$ to close another circuit and thus sound said signal. In the proportions shown, the drum has a full revolution in every twelve hours, but these proportions may be varied to suit the demands of the trade.

Having thus described our invention, what we claim as new, and desire to secure by Letters Patent, is—

1. The combination of a clock, a shaft having a clutch-controlled gear-connection with the minute-hand arbor of the clock, a drum loose on the shaft, a coil-spring connecting the drum and shaft, a stop on the drum, an arm on the shaft in the path of the stop, a covering of paper on said drum, a series of guides parallel to the aforesaid drum, printing keys for insertion in the guides, and an ink-ribbon interposed between said guides and paper, substantially as set forth.

2. The combination of a clock, a shaft having a clutch-controlled gear-connection with the minute-hand arbor of the clock, a drum loose on the shaft, a coil-spring connecting the drum and shaft, a stop on the drum, an arm on the shaft in the path of the stop, a covering of paper on said drum, a series of guides parallel to the aforesaid drum, printing keys for insertion in the guides, ink-ribbons of contrasting colors, and suitable means for bringing either ribbon between said guides and paper, substantially as set forth.

3. The combination of a clock, a shaft having a clutch-controlled gear-connection with the minute-hand arbor of the clock, a movable spring-controlled step for the shaft, contact points opposed to said shaft, a source of electricity and an audible signal wired to the contact points, a drum loose on the shaft, a coil spring connecting the drum and shaft, a stop on the drum, an arm on the aforesaid shaft in the path of the stop, a covering of paper on said drum, a series of guides parallel to the aforesaid drum, printing keys for insertion in the guides, and an ink-ribbon interposed between said guides and paper, substantially as set forth.

4. The combination of a clock having its minute-hand arbor provided with a pinion, a shaft provided with a loose crown-wheel in mesh with the pinion and having the clutch-hub, a spring-and-lever controlled clutch-collar splined on the shaft to come in and out of engagement with said hub, a drum rotative with said shaft, a covering of paper on the drum, a series of guides parallel to said drum, printing keys insertible in the guides, and an ink-ribbon interposed between said guides and paper, substantially as set forth.

5. The combination of a clock having its minute-hand arbor provided with a pinion, a shaft provided with a loose crown-wheel in mesh with the pinion and having a clutch-hub, a spring supported clutch-collar splined to the shaft to engage with said hub, a pivoted spanner controlling the clutch collar, a lever linked to the spanner, a pivotal cam-disk opposed to the lever, a drum rotative with the shaft, a covering of paper on the drum, a series of guides, printing keys insertible in the guides, and an ink-ribbon between said guides and paper, substantially as set forth.

6. The combination of a clock, a rotative drum controlled by the clock, and having a portion thereof in the form of a gate, a roll of paper journaled in the drum but having a portion thereof arranged upon the outside of the same and held in place by the gate, an ink-ribbon opposed to the paper on the drum, guides opposing the ink-ribbon, and printing keys insertible in the guides, substantially as set forth.

7. The combination of a rotative drum having a portion thereof in the form of a gate, retaining devices on the inner side of the gate, a roll of paper within the drum, and suitable means for locking the roll against rotation on its axis, substantially as set forth.

8. The combination of a rotative drum having a portion thereof in the form of a gate, retaining devices on the inner side of the gate, a conical stud on one head of the drum, a roller engaging the stud, a shouldered pin having a blade engaging the other end of the roller, a nut loose on the pin and engaging the other head of the drum, and a web of paper on said roller, substantially as set forth.

9. The combination of a rotative drum having a portion thereof in the form of a gate, curved brackets constituting hinges for the gate a spring catch for engagement with a notch in one of the brackets, spring-clamps upon the inner side of the gate, a roll of paper within the drum, and suitable means for locking the roll against rotation on its axis, substantially as set forth.

10. The combination of a rotative paper-covered drum, a pair of rack bars at right angles to the drum, a plurality of spools carried on each rack-bar, a lever-controlled rod carrying toothed quadrants that engage the rack-bars, ink-ribbons of contrasting color connecting the spools on one rack-bar with those on the other, a series of guides parallel to the drum, and printing-keys insertible in the guides against either ribbon brought opposite the same, substantially as set forth.

11. The combination of a pair of simultaneously adjustable bars, a suitable case fast to each bar, a pair of independently rotative spools arranged in each case, ink-ribbons connecting the spools in one case with those in the other, and suitable means for preventing free rotation of said spools, substantially as set forth.

12. The web of record paper having vertical rows of perforations in pairs at certain intervals, the distance between the rows in each pair being equal to the width of a predetermined fold, and the distance between the inner row of one pair and the outer row of the succeeding pair being equal to the circumference of a drum of predetermined diameter, said paper being ruled to represent hours and fractional divisions of the same, substantially as set forth.

In testimony that we claim the foregoing we have hereunto set our hands, at Milwaukee, in the county of Milwaukee and State of Wisconsin, in the presence of two witnesses.

FRANK H. BOLTE.
EDWARD D. KING.

Witnesses:
N. E. OLIPHANT,
HENRY DANKERT.